United States Patent
Pham (10) Patent No.: US 10,479,260 B2
(45) Date of Patent: Nov. 19, 2019

(54) RECREATIONAL VEHICLES WITH SLIDE-OUT FLOOR SLIDING UNDER MAIN RV FLOOR

(71) Applicant: Tuan Anh Pham, Huntington Beach, CA (US)

(72) Inventor: Tuan Anh Pham, Huntington Beach, CA (US)

(*) Notice: Subject to any disclaimer, the term of this patent is extended or adjusted under 35 U.S.C. 154(b) by 197 days.

(21) Appl. No.: 15/813,014

(22) Filed: Nov. 14, 2017

(65) Prior Publication Data

US 2019/0143875 A1 May 16, 2019

(51) Int. Cl.
*B60P 3/34* (2006.01)

(52) U.S. Cl.
CPC ..................... *B60P 3/34* (2013.01)

(58) Field of Classification Search
CPC ........... B60P 3/34; B60P 3/36; B60Y 2200/80
USPC ... 296/26.08, 26.09, 26.1, 26.11, 26.12, 165, 296/171–173, 176
See application file for complete search history.

(56) References Cited

U.S. PATENT DOCUMENTS

| | | | | |
|---|---|---|---|---|
| 1,972,415 A * | 9/1934 | Anderson | ............ | B60P 3/34 296/171 |
| 2,150,615 A * | 3/1939 | Sword | ............ | B60P 3/34 296/26.13 |
| 5,915,774 A * | 6/1999 | Tiedge | ............ | B60P 3/34 296/175 |
| 7,258,389 B2 * | 8/2007 | Franzini | ............ | B60P 3/34 296/156 |
| 7,588,279 B2 * | 9/2009 | Rasmussen | ............ | B60P 3/34 296/26.12 |
| 8,366,168 B1 * | 2/2013 | Ksiezopolski | ........ | E06B 7/2309 296/165 |
| 9,855,880 B1 * | 1/2018 | Pham | ............ | B60P 3/36 |
| 2004/0066060 A1 * | 4/2004 | Rasmussen | ............ | B60P 3/34 296/165 |
| 2004/0256874 A1 * | 12/2004 | Rex | ............ | B60P 3/34 296/26.13 |
| 2005/0189785 A1 * | 9/2005 | Harder | ............ | B60P 3/34 296/171 |
| 2015/0102632 A1 * | 4/2015 | Pham | ............ | B60P 3/34 296/175 |
| 2016/0101719 A1 * | 4/2016 | Nash | ............ | B60P 3/34 296/26.13 |
| 2019/0143875 A1 * | 5/2019 | Pham | ............ | B60P 3/34 |

* cited by examiner

*Primary Examiner* — Joshua E Rodden (57) ABSTRACT

The present invention relates to a vehicle having a fixed room and a slide-out room which extends and retracts relative to the fixed room. The slide-out room having a floor sliding under the main RV floor. The slide-out room is able to locate over the vehicle wheel wells with the slide-out floor lower than the top of the wheel well allowing for a much lower vehicle profile. The fixed room includes a main floor section, sidewall sections, and a roof section. The slide-out room includes a floor section which has more than one level of flooring to cover the wheel well and the step-down entrance door well section. Furthermore, when the slide-out room is retracted, the slide-out floor slides under the main floor to tuck underneath the main floor. The vehicle of the present invention may have other slide-out assemblies in the fixed room above the main floor.

12 Claims, 8 Drawing Sheets

RECREATIONAL VEHICLES WITH SLIDE-OUT FLOOR SLIDING UNDER MAIN RV FLOOR

BACKGROUND OF THE INVENTION

Field of the Invention

The present invention relates to recreational vehicles (RV's), and more particularly, to motor homes and travel trailers that are adapted in size so as to increase the available living space of the vehicle.

Discussion of Prior Art

Figure 2:
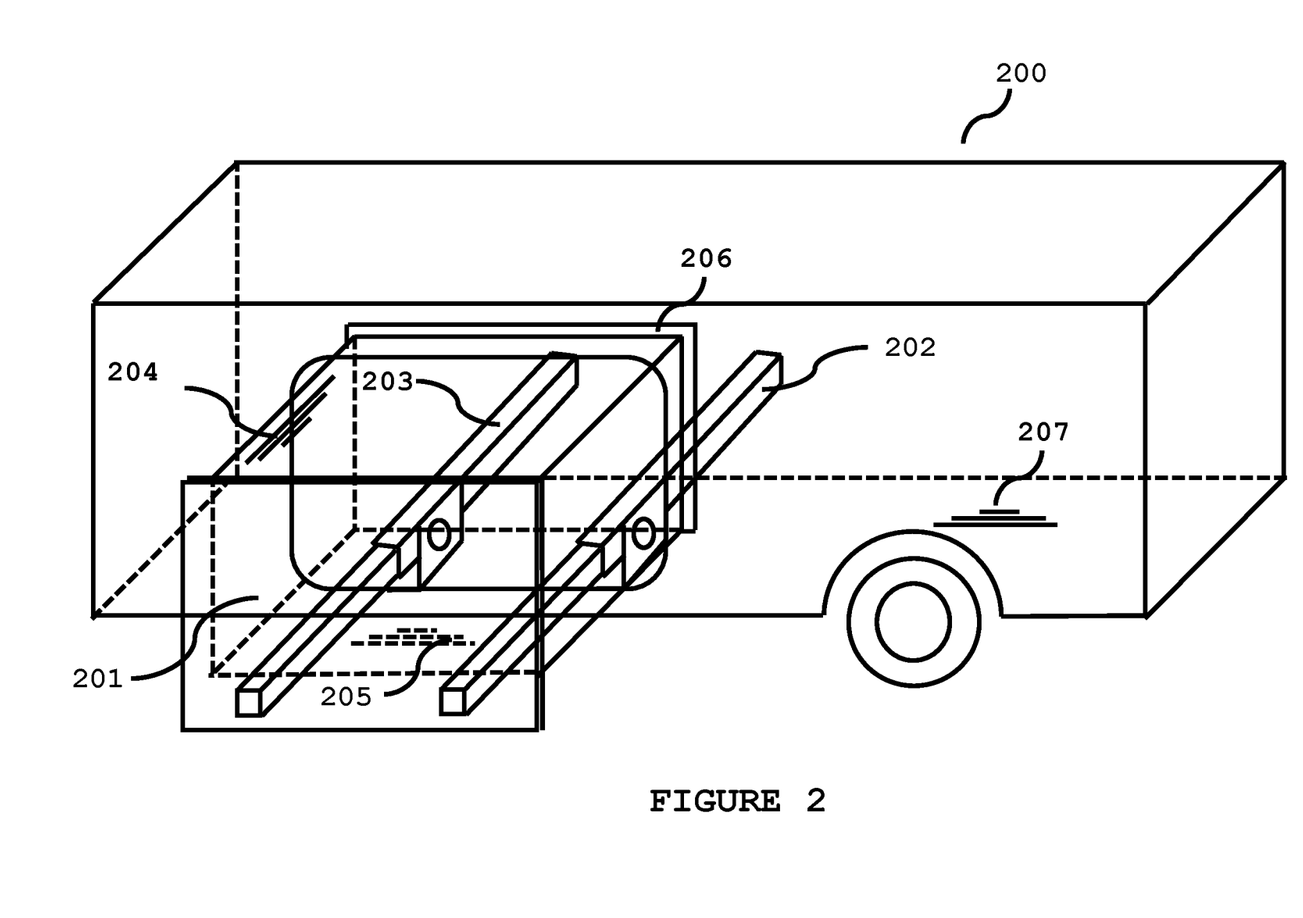
FIG. 2 is a perspective view of a prior art RV with a slide-out extended through the sidewall.

Present day recreational vehicles with slide-out rooms are very common. However, numerous prior art describe slide-out rooms which requires a level floor to operate. Such slide-outs are either above the wheel wells of the vehicle which dictate a higher roof or avoiding the wheel well area which dictate a longer vehicle body. For a very small recreational vehicle with a small body where the wheels are most likely to be at or near the center of the vehicle body, those slide-out rooms which require a level floor to operate are not workable. Moreover, in prior art, a typical slide-out room design of a vehicle 200 as shown in FIG. 2 consists of a box-like design slide-out room 201, a floor section 205 which is substantially the same area of the roof 204, a set of slide-out mechanism 202 and 203 to extend and retract the slide-out room, stop walls 206. In prior art, when slide-out room 201 is extended or retracted, the slide-out room 201 relies on plurality of slideable members (not shown) to glide on the floor of the vehicle 200 necessitates an even floor space, thus, mostly avoiding the wheel well area. Furthermore, when slide-out room 201 is fully extended, the slide-out room 201 relies on the slide-out mechanism 202 and 203 together with stop walls 206 to provide structure support to hold slide-out room in place. Thusly, in the fully extended position, the floor of the slide-out room is above the floor of the main floor 207 of the vehicle. Numerous prior art describing different methods and systems to level slide-out floor 205 with the main floor 207 of the vehicle. Bryan E. Tillett's U.S. Pat. No. 5,706,612 disclosed a method of leveling the slide-out floor with the main trailer floor by sliding the slide-out past the main floor of the trailer down an inclined slope to level with the main trailer floor. Another approach is disclosed by U.S. Pat. No. 6,976,721 B2 to C. Martin Rasmussen. Rasmussen's patent disclosed a pivot system where the slide-out room is pivot downward so that the slide-out floor is substantially level with the main trailer floor. Another prior art disclosed by U.S. Pat. No. 5,577,351 to James E. Dewald, Jr. et al. In Dewald et al. patent, the slide-out room is extended past the main floor then lowered to the same level of the main floor. In general, the conventional design to achieve a flush floor between the slide-out room and the main RV floor is to extend the slide-out room past the main RV floor then lower or tilt the slide-out room to achieve a flush floor. The main disadvantages of these approaches are the complexity for the structure support and the power required to manipulate (i.e. tilt, lower) the slide-out room to achieve a flush floor while in the fully extended position.

Therefore, what is desired is a method and system that can provide a slide-out room with multiple flooring levels to accommodate the wheel wells and other floor levels such as step-down entrance door well yet does not require complex structure support to achieve a substantially near flush floor throughout the RV.

SUMMARY OF THE INVENTION

In one aspect of the present invention, a vehicle body structure is provided with a slide-out room over the wheel wells of the vehicle. In an exemplary embodiment, the vehicle comprises a fixed room, a slide-out room, and a slide-out extension mechanism (not shown) capable of extending and retracting the slide-out room relative to the fixed room. Presently, the slide-out extension mechanism is a commercial product readily available for purchase from a number of Original Equipment Manufactures (EOM) such as Lippert Components Inc., Barker Manufacturing Co., etc. In one aspect of the present invention, the fixed room comprises a floor section with a cut out area overlapping a substantially large area over the slide-out floor to allow the slide-out floor placement below the floor of the fixed room at the cut out area having a substantial area of the slide-out floor available for the slide-out room and furniture installation protruding above the main floor of the RV, a plurality of sidewall sections with at least one large sidewall opening on the sidewall parallel to the side of the recreational vehicle to accomdate the slide-out room, and a roof section. The slide-out room comprising a floor section which covers substantially the width of the fix room floor, a three sided sidewall section with the opening facing toward the inside of the fixed room forming a room extension to the fixed room, and a slide-out roof section. Furthermore, the slide-out floor is supported by a plurality of rollers or slidable members and structurally attached to the slide-out extension mechanism to extend and to retract the slide-out room in a cantilevered manner.

In another aspect of the invention, when the slide-out room is extended out, substantially half of the slide-out floor is outside of the fixed room, the remaining half of the slide-out floor remains inside the fixed room to act as counterweight for the slide-out room. Furthermore, when the slide-out room is extended out, the portion of the slide-out floor tucked underneath the fixed room floor will slide out to provide floor coverage for the displaced floor area at the fixed room cut-out floor area. Moreover, the fixed room floor edges at the cut-out area are having the inclined edges so that the floor level between the slide-out room floor and the fixed room will have a slight incline slope to prevent tripping hazards. Furthermore, to help with the slide-out floor sliding under the fixed room floor, the fixed floor area directly above the slide-out floor is fitted with rollers at the edge facing the floor of the slide-out room. These rollers will assist the slide-out floor to slide under the fixed floor more readily.

This brief summary, rather broadly, has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

Figure 1:
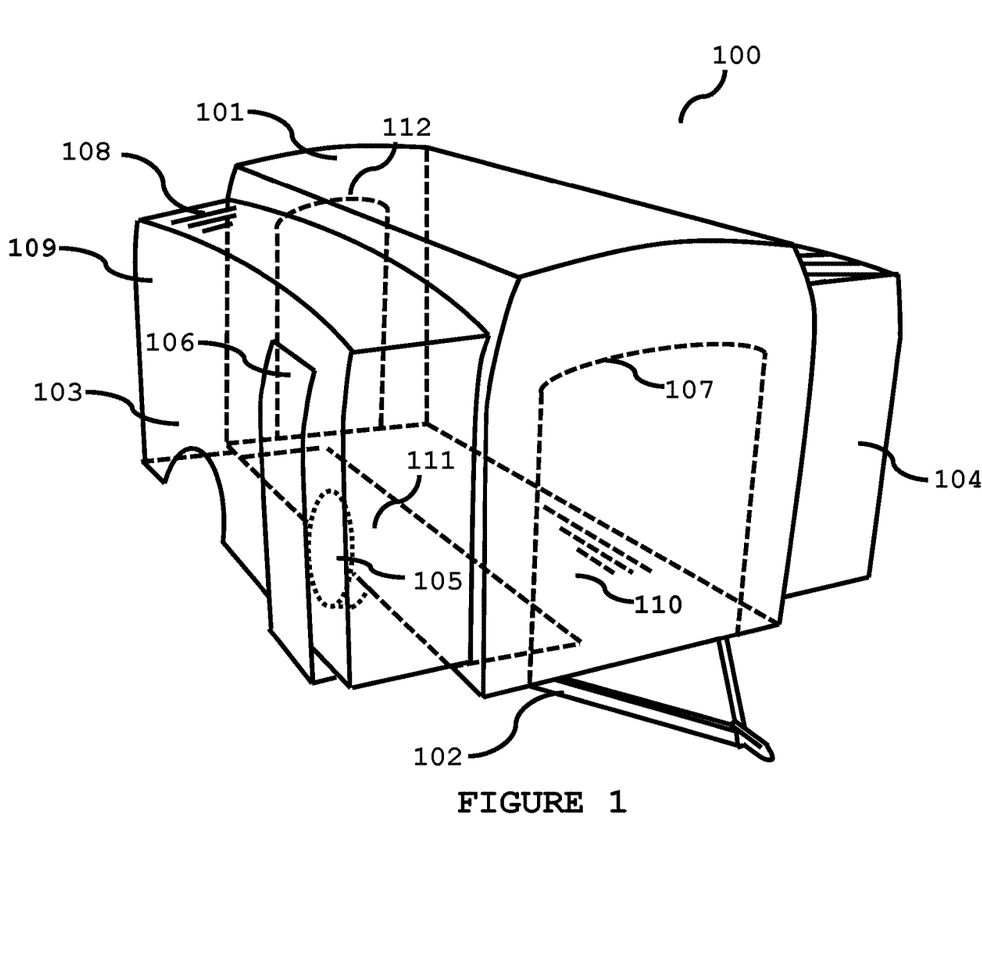
FIG. 1 is a perspective view of a RV body structure comprises of a rigid enclosed body shell forming a fixed room and a carriage assembly with wheels and floor structure support (not shown), and with two slide-out rooms in the extended positions.

FIG. 1 illustrates one embodiment of a RV's body structure 100 comprising of a rigid body shell forming a fixed room 101, a carriage assembly 102 having a plurality of wheels 105, and two slide-out rooms 103 and 104 in the extended positions. The body structure 100 may be part of a motorized RV or a towable trailer. The carriage assembly 102 attached to a plurality of wheels 105 so as to permit rolling movement of the motorized RV or a towable trailer. FIG. 1 further illustrates a fixed room 101 that is mounted above carriage assembly 102 having the main roof, front and rear walls, side walls, with openings on the side walls to accommodate two slide-out rooms 103 and 104, and a main floor 110 having a cut-out area 111 for the slide-out 103 to protrude through. Furthermore, the slide-out rooms 103 and 104 are coupled to the carriage assembly 102 by either electrically, or hydraulically, or electro-mechanically operated slide-out mechanism (not shown) in order to extend or retract the slide-out rooms 103 and 104 independently of each other's. In the preferred embodiment, the exterior wall of slide-out room 103 having at least one entry door 106. In another preferred embodiment, the slide-out room 103 having a longitudinally curved roof 108 to discharge rain water onto the sides of the slide-out room 103 in the directions of front and back of the RV. In another preferred embodiment, the fixed room 101 having at least one cut out opening 112 to facilitate fixed room 101 access from the rear of the RV. In yet another preferred embodiment, for motorized RV, the fixed room 101 having at least one cut out opening 107 to facilitate fixed room 101 access directly from the front driving cab area. The slide-out rooms 103 and 104 may either be placed in the extended position independently so as to effectively increase the desired living space of RV body structure 100.

Figure 3:
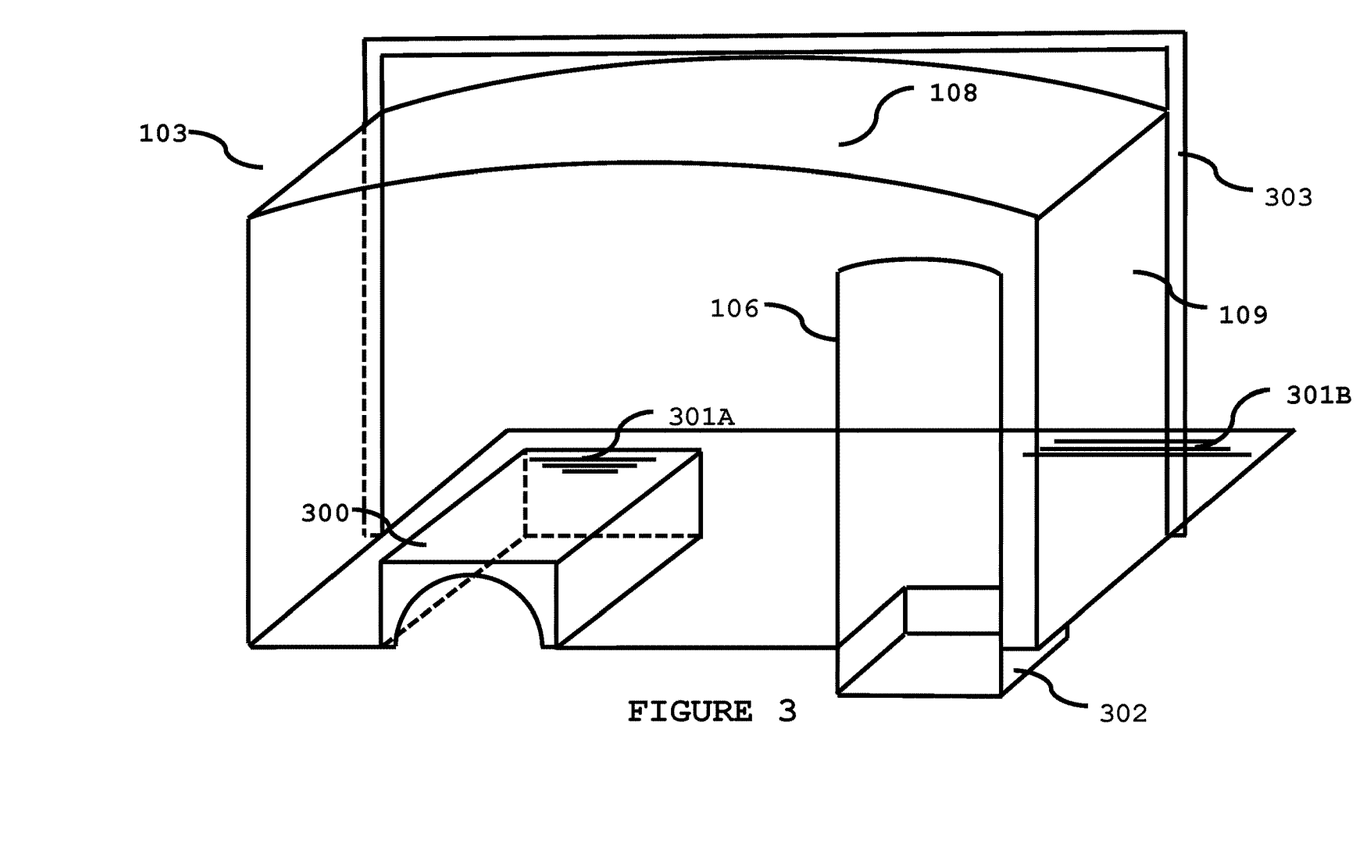
FIG. 3 is a perspective view of the slide-out room in accordance with present invention.

With reference to FIG. 3, not to be taken in a limiting sense, a detailed plan of the slide-out room 103 of FIG. 1. In FIG. 3, the slide-out room 103 comprises of a floor section having a floor level 301A above the wheel well 300 and the main slide-out floor section 301B having at least the floor space substantially the same floor space of the cut out area of fixed room 101 of FIG. 1 plus the floor space of the slide-out when fully extended so that the cut-out area of fixed room 101 is still having slide-out floor coverage when the slide-out 103 is in fully extended mode. The slide-out room floor section 301B having a sunken floor area 302 of the step-down entrance door well substantially the same width of the entrance door 106. Along the edges of the plurality of sidewalls 109 and roof 108 of the slide-out room opening facing the interior of the fixed room 101 of FIG. 1, the slide-out room 103 has a plurality of stop walls 303 lined with commercially available rubber seal forming a weather tight seal to the slide-out opening of fixed room 101. In one aspect of the present invention, slide-out room 103 is normally the street side slide-out room of the RV 100. The substantial size of the slide-out room floor section 301B provides structure support for the floor area 301A over the wheel well 300 when the slide-out room 103 is fully extended outside the body of the fixed room 101 of FIG. 1.

Figure 4:
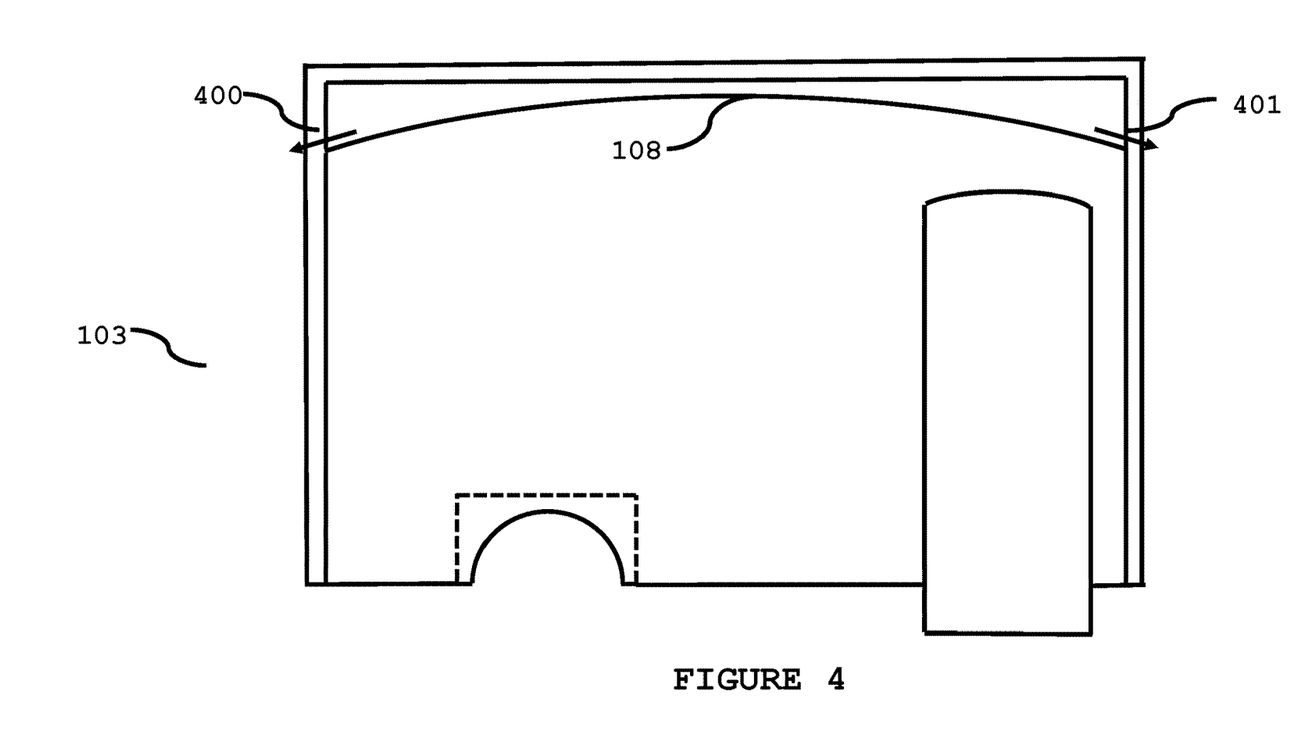
FIG. 4 is a cross sectional view of the slide-out room showing the longitudinally curved roof having water discharging to the sides of the slide-out room facing the front and rear of the vehicle.

Reference will now be made with FIG. 4 which provides the detailed cross sectional view of the slide-out room 103. With reference to FIG. 4, not to be taken in a limiting sense, a detailed plan for the slide-out room 103 body structure of FIG. 1, wherein, the roof 108 having the curvature in the same longitudinal direction of the fixed room 101 of FIG. 1 with the highest point substantially in the middle of the roof so that rain water is discharged to the sides of the slide-out in the direction of the front and the rear directions of the vehicle as indicated in the directional indicators 400 and 401 eliminating the need for a separate slanting roof cover or a separate slide-out awning to prevent rain water from entering inside the body of the RV. It can be appreciated that the arrangement of the roof curvature illustrated herein is simply illustrative of one of a number of possible curvature arrangements and that a number of variations of these arrangements can be made without departing from the spirit of the present invention. Those who are skilled in the art can fabricate a curvature arrangement so that the highest point of the roof curvature is not at the center and rain water can be discharged either to one side of the slide-out in the direction of front or back, or to both sides of the slide-out with the bulk of the rain water discharged more on one side than the other.

Figure 5A:
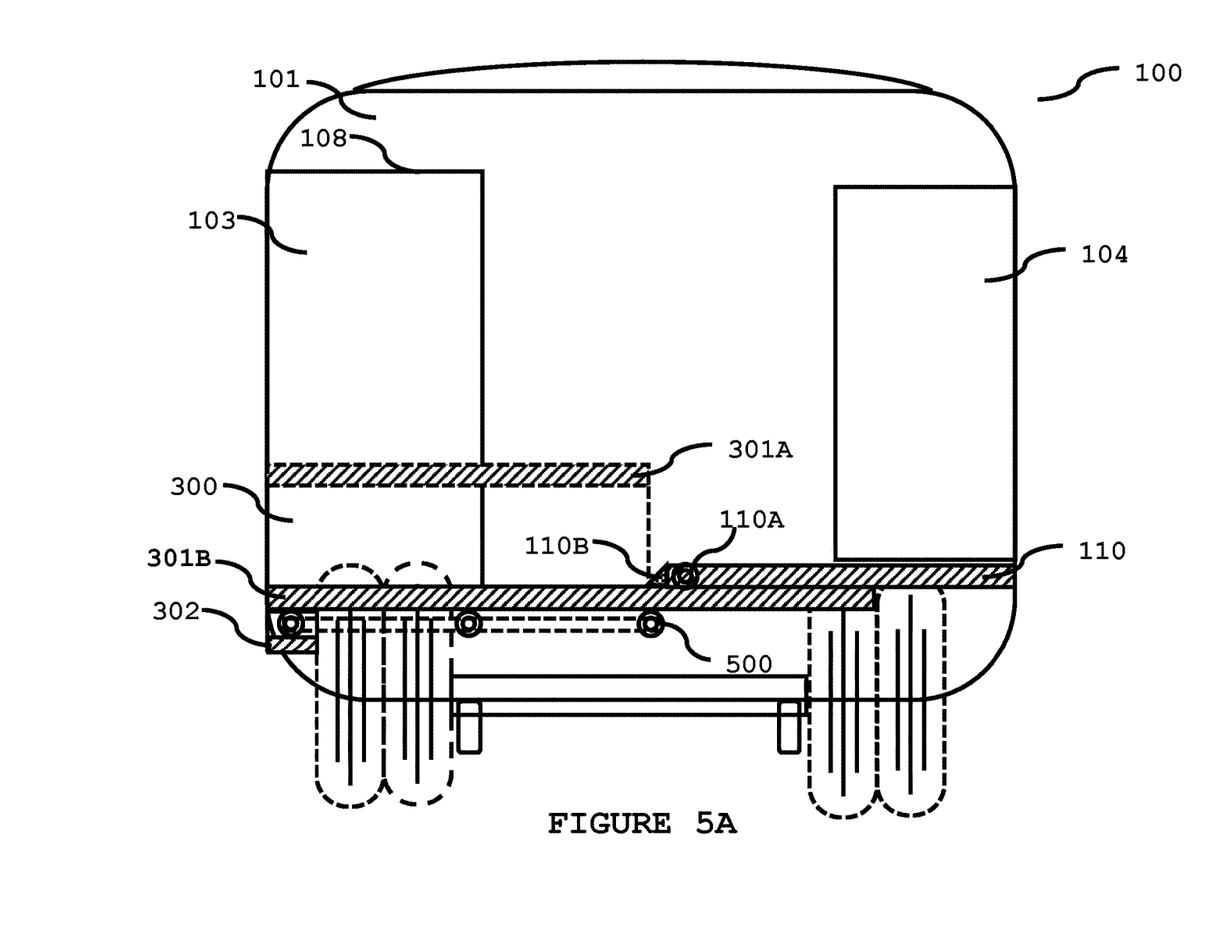
FIG. 5A is the cross sectional view of the RV body structure of FIG. 1 with the two slide-out rooms in the fully retracted positions; having a substantial portion of the slide-out floor tucked under the main floor of the fixed room.
Figure 5B:
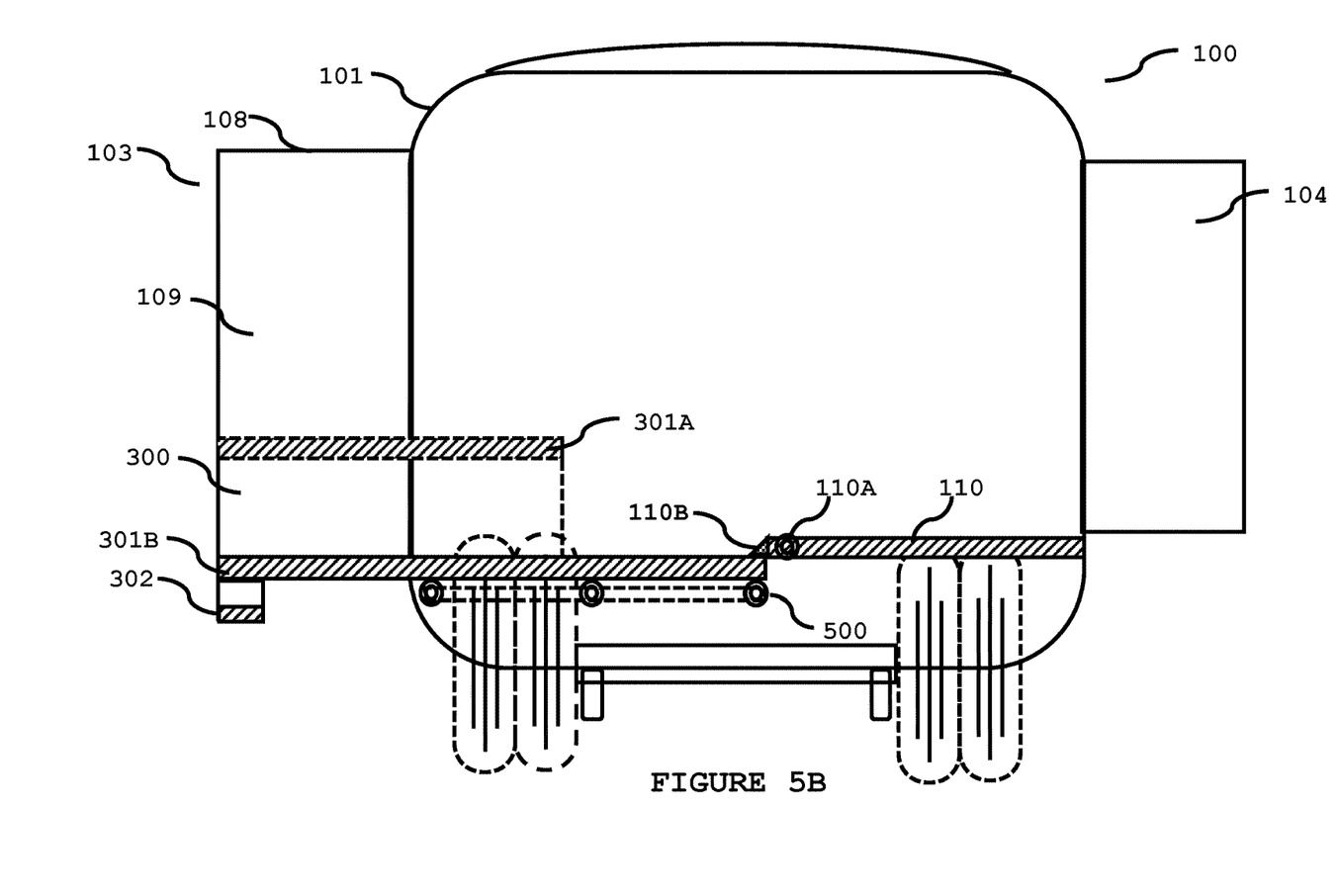
FIG. 5B is a cross sectional view of a RV body structure of FIG. 1 comprises of a fixed room in a body shell and a carriage assembly with wheels and floor structure support, and with two slide-out rooms in the extended positions; having the fixed room main floor directly above the floor of the slide-out forming a contiguous floor having the slide-out floor marginally sunken below the main floor of the fixed room.

Reference will now be made with FIGS. 5A and 5B which provide the detailed cross sectional view of a RV's body structure 100 of FIG. 1. With reference to FIG. 5A, not to be taken in a limiting sense, a detailed plan for the RV body structure of FIG. 1 having the slide-out 103 in a fully retracted mode. In one aspect of the present invention, the slide-out floor having multiple levels 301A and 301B in order to cover the substantial floor area of the RV body width and also provide floor covering for the wheel well 300 and the sunken floor area 302 of the step-down entrance door well. In FIG. 5A, the main slide-out floor 301B is mounted directly below the main floor 110 of the fixed room 101 of FIG. 1. Moreover, the slide-out floor is supported by a plurality of rollers 500 to provide ease of movement of the slide-out floor 301B while under the load of the fixed room main floor 110. It will be appreciated that the design of the rollers 500 or any similar slidable members illustrated herein is simply illustrative of one of a number of possible designs that can be made without departing from the spirit of the present invention. To reduce the friction between the slide-out floor 301B and the fixed room main floor 110, the edge of the cut-out area in the fixed room main floor 110 facing the direction of the slide-out travel is fitted with plurality of rollers 110A to facilitate ease of movement of the slide-out floor 301B while under the load of the fixed room main floor 110. It will be appreciated that the placement of the rollers on the fixed room main floor illustrated herein is simply illustrative of one of a number of possible placement locations that can be made without departing from the spirit of the present invention. Moreover, the main floor cut-out area 111 (not shown) in the fixed room main floor 110 having inclined edges 110B to prevent tripping hazards. With reference to FIG. 5B, not to be taken in a limiting sense, in the fully extended mode, slide-out room 103 will only extend telescopically as much as the slide-out sidewalls 109 and the roof 108 can still provide cover. It can be appreciated that since the contiguous floor is achieved only by sliding out the slide-out floor portion of the slide-out floor 301B tucked under the main floor 110, the present invention has eliminated the need to manipulate (i.e. tilting, lowering) the slide-out room 103 in order to obtain a contiguous and substantially flush floor throughout the RV. Furthermore, the substantial size of the floor 301B provides the structure rigidity to fully cover the wheel well 300 both in the fully extended and retracted modes, thus, making the present invention suitable even for a very small RV body size.

Figure 6A:
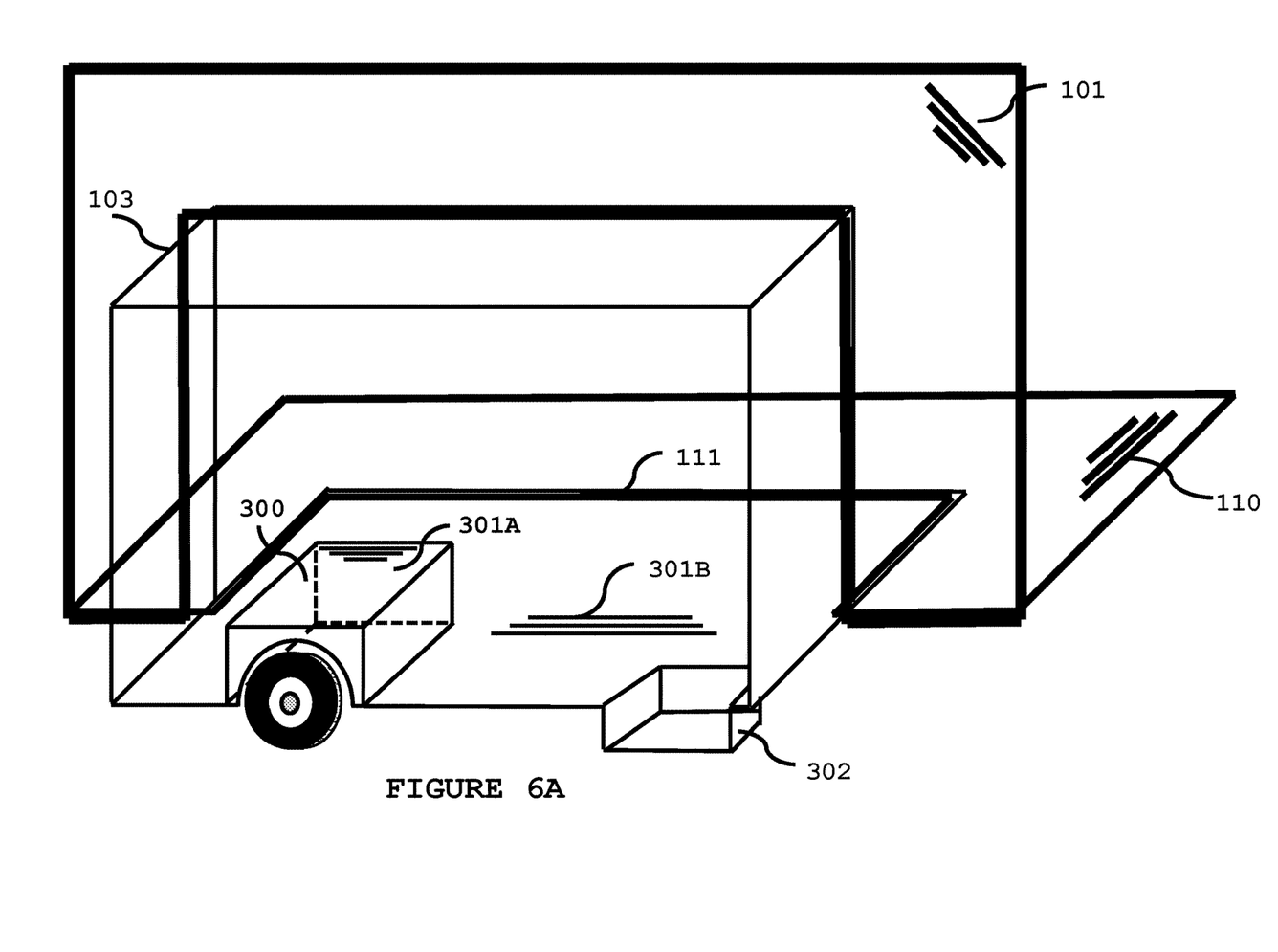
FIG. 6A is an enlarged perspective view of an embodiment of the slide-out opening of the fixed room of the RV body structure of FIG. 1; having a slide-out room in the fully extended mode; having a slide-out floor with mutiple floor levels covering wheel well and the step-down entrance door well; having the floor of the slide-out to slide out from under the fixed room main floor to form a contiguous floor throughout the RV according to an embodiment of the present invention.

We now refer to FIG. 6A, not to be taken in a limiting sense, FIG. 6A illustrates one aspect of the present invention for a method of achieving a contiguous and substantially flush floor throughout the RV when the slide-out room 103 is fully extended. In FIG. 6A, the floor area 301A over the wheel well 300 is substantially large to allow the slide-out floor 301A to cover the wheels when the slide-out room 103 is in fully retracted mode or when the slide-out room 103 is in fully extended mode. Above the wheel well 300, creative placement of RV cabinets (not shown for clarity purposes) will hide the body of wheel well 300 from view. The remainder of slide-room floor 301B is overlapping with the fixed room main floor 110 and will be used to form a contiguous and substantially flush floor throughout the RV when the slide-out room 103 is fully extended. In another aspect of the present invention, FIG. 6A illustrates where the placement of the wheel well and the step-down entrance door well will occupy only the portion of the slide-out room floor 301B well within the cover of the sidewalls and roof of the slide-out 103. The remaining slide-out room floor 301B will remain inside the fixed room 101 and will act as counter-weight to the extended half of the slide-out room 103.

Figure 6B:
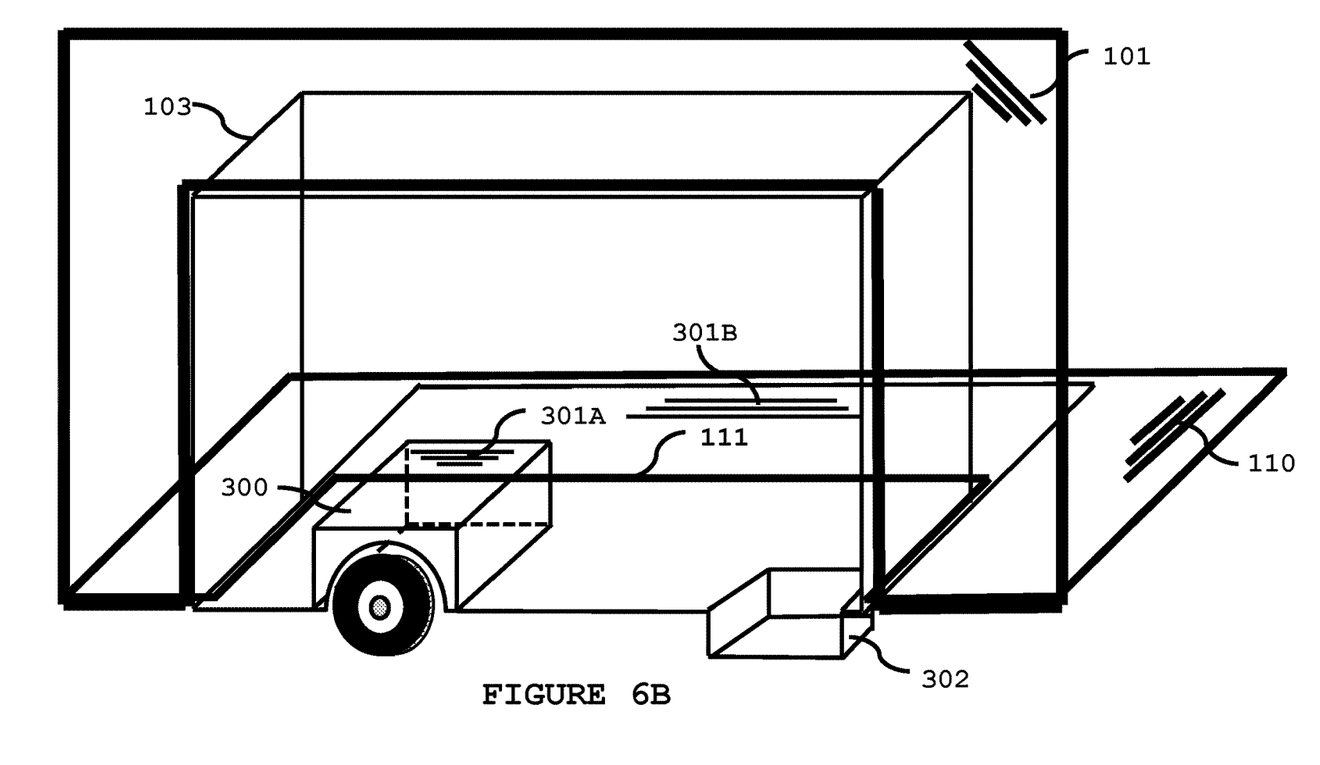
FIG. 6B is an enlarged perspective view of an embodiment of the slide-out opening of the fixed room of the RV body structure of FIG. 1; having a slide-out room in the fully retracted mode; having the slide-out floor tucked under the main floor of the fixed room according to an embodiment of the present invention.

We now refer to FIG. 6B, not to be taken in a limiting sense. FIG. 6B depicts slide-out room 103 in the fully retracted mode with a substantial portion of the slide-out room floor 301B slid under the fixed room main floor 110 allowing the slide-out 103 being fully retracted in having the slide-out exterior wall flush with the fixed room 101 side wall for travel.

Although the present invention has been described with reference to specific embodiments, these embodiments are illustrative only and not limiting. Many other applications and embodiments of the present invention will be apparent in light of this disclosure and the following claims.

The invention claimed is:

1. An expansible body structure for recreation vehicles, the expansible body structure comprising: a carriage assembly having a plurality of wheels, a rigid body shell enclosure having a means for mounting onto the carriage assembly, the rigid body shell enclosure comprising a roof section, a plurality of sidewall sections defining a main living space, the plurality of sidewall sections including a front sidewall section facing a direction of travel, a rear sidewall section facing an opposite direction to the front sidewall section, and a plurality of side-body sidewall sections, and a floor section having a plurality of cut out areas where the floor section overlaps with the wheels of the carriage assembly allowing the floor section of the rigid body shell enclosure to have a placement on the carriage assembly at a height substantially lower than a diameter of the wheels, the side-body sidewall sections of the rigid body shell enclosure each having at least one substantially large opening, an extendable slide-out assembly mounted inside the rigid body shell enclosure at one of the large openings, the slide-out assembly comprising a floor section having multiple levels, a plurality of sidewalk, and a roof forming a room extension with one side opening toward the main living space of the rigid body shell enclosure, another side of the slide-out assembly facing an outside of the vehicle having an opening for egress, the slide-out assembly having a means to extend through the respective large opening of the rigid body shell enclosure from a retracted position to an extended position to provide a larger living area in the main living space, the slide-out assembly having a means to retract the slide-out assembly from the extended position to the retracted position having the another side of the slide-out assembly flush with the respective side-body sidewall section of the rigid body shell enclosure, the multiple levels of the floor section of the slide-out assembly comprising a main floor level connecting to a substantial portion of the floor section of the rigid body shell, an elevated floor level above the wheels of the carriage assembly, and a sunken floor level at the opening for egress, the elevated floor level having a plurality of sidewall sections forming a wheel well box having an opening facing the wheels of the carriage assembly, the volume of the wheel well box is substantially large and the elevated floor level of the wheel well box having a height substantially above a top of the wheels for the wheel well box to clear the wheels of the vehicle during the extended and retracted positions of the slide-out assembly, the sunken floor level at the opening for egress comprising a sunken floor area and a plurality of sidewalls forming a step-down entrance door well having an opening facing the outside of the rigid body shell enclosure, a width of the entrance door well opening facing the outside of the rigid body shell enclosure having substantially a same width as the opening for egress forming an egress opening extension for a taller egress opening, the slide-out assembly having stop walls along edges of the plurality of sidewalls and the roof to form a weather tight seal between the slide-out assembly and the rigid enclosure body shell enclosure, at a location of the respective large opening of the sidewall section for the slide-out assembly to extend and retract through, the floor section of the rigid body shell enclosure having a substantially large cut out area to allow the main floor level of the slide-out assembly to be installed directly below the floor section of the rigid body shell enclosure, with the sidewalls, roof, and the wheel well box of the slide-out assembly protrude above the floor section of the rigid body shell enclosure, the main floor level of the slide-out assembly having substantial size to provide floor coverage for the large cut out area of the floor section of the rigid body shell enclosure when the slide-out assembly is in the extended position, the floor section of the rigid body shell enclosure remaining above the main floor level of the slide-out assembly when the slide-out assembly is fully extended in the extended position, the expansible body structure for recreational vehicle configured to be in the form of a towable trailer, or part of a motorized recreational vehicle having a driving cab area abutting to the front sidewall section of the rigid body shell enclosure, for a vehicle operator to operate the vehicle.

2. The recreational vehicle according to claim 1, wherein the slide-out assembly having the floor section overlapping with the floor section of the rigid body shell adjacent to the large cut out area of the rigid body shell; the main floor level substantially covering the large cut out area to form a contiguous level floor throughout the body structure vehicle when the slide-out assembly is fully extended.

3. The recreational vehicle according to claim 1, wherein the large cut out area of the floor section of the rigid body shell enclosure has inclined edges so that a floor level between the main floor level of the slide-out assembly and the floor section of the rigid body shell enclosure will have an incline slope to prevent tripping hazards.

4. The recreational vehicle according to claim 1, wherein an edge of the floor section of the rigid body shell enclosure directly above the floor section of the slide-out assembly having fitted with rollers to facilitate ease of movement for the floor section of the slide-out assembly to slide under the floor section of the rigid body shell enclosure when the slide-out assembly is in the retracted position or when the slide-out assembly is extended position.

5. The recreational vehicle according to claim 1, having a means for the floor section of the slide-out assembly to slide and tuck under the floor section of the rigid body shell enclosure when the slide-out assembly is in the retracted position and flush with the respective large opening.

6. The recreational vehicle according to claim 1, wherein the roof of the slide-out assembly having a curvature in a same longitudinal direction of the rigid body shell enclosure with a highest point substantially in a middle of the roof so that rain water is discharged to the sidewalls of the slide-out assembly in a direction of front and rear directions of the rigid body shell enclosure.

7. The recreational vehicle according to claim 1, wherein the rigid body shell enclosure having a front sidewall cut out to provide access to a driving cab area.

8. The recreational vehicle according to claim 1, wherein the rigid body shell enclosure having a rear sidewall cut out to provide rear egress.

9. The recreational vehicle according to claim 1, wherein the rigid body shell enclosure has an additional slide-out assembly in an area adjacent to large cut out area of the floor section of the rigid body shell.

10. The recreational vehicle according to claim 1, wherein the main living space is configured to be expanded by extending the slide-out assembly only a width of the floor section of the slide-out assembly.

11. The recreational vehicle according to claim 1, wherein the slide-out assembly is configured to be stowed for travelling by retracting the slide-out assembly to be flush the rigid body shell enclosure.

12. The recreational vehicle according to claim 1, wherein the slide-out assembly is configured for extending only a width of the floor section of the slide-out assembly, using a weight of a remaining half of the floor section of the slide-out assembly and held in place by the stop walls of the slide-out, to act as counter-weight to an extended half of the slide-out assembly.

* * * * *